United States Patent Office 3,395,127
Patented July 30, 1968

3,395,127
METAL HEXAFLUOROSILICATES AS CATALYSTS IN THE PRODUCTION OF POLYESTERS
Frank Dobinson, Chapel Hill, N.C., assignor to Monsanto Company, St. Louis, Mo., a corporation of Delaware
No Drawing. Filed May 5, 1964, Ser. No. 365,171
11 Claims. (Cl. 260—75)

This invention relates to an improved method for the preparation of high molecular weight polyesters, such as those obtained by condensation reactions of polyhydric alcohol and dibasic acids or reactive derivatives thereof, in the presence of a catalyst. More particularly, the invention relates to the use of metal hexafluorosilicates as catalysts in the preparation of fiber-forming polyesters.

In the present day commercial manufacture of high polymeric polymethylene terephthalates it is common practice to use as starting materials a dialkyl terephthalate and a glycol, for example, dimethyl terephthalate and ethylene glycol. However, provided terephthalic acid of a sufficient degree of purity can be obtained, the dimethyl terephthalate can be replaced by terephthalic acid. The terephthalic acid or the dialkyl ester thereof is subjected to esterification or ester-interchange with the glycol, preferably in the presence of a suitable catalyst and if desired under superatmospheric pressure conditions. The bis-hydroxyalkyl terephthalate and low polymers thus formed are polycondensed, desirably under reduced pressure and preferably in the presence of a polycondensation catalyst until a filament and fiber-forming high polymeric polymethylene terephthalate is obtained.

In the commercial preparation of polyesters, the use of a polycondensation catalyst to produce in short periods of time a fiber-forming polymer of high molecular weight having a lack of discoloration is very desirable. There have been many polycondensation catalysts proposed for use in the preparation of polyesters. However, these prior art catalysts have been lacking in that either too long a time of polymerization is needed to produce a polymer having the desired degree of polymerization or a discolored polymer is produced. Therefore, a catalyst that would enable the preparation of polyesters having a high molecular weight and desirable color cmharacteristics in a relatively short period of time is desirable.

It is an object of this invention to provide an improved process for the polymerization of reactive intermediates obtained from glycol and dicarboxylic acids or polyester-forming derivatives thereof into high molecular weight polyesters.

It is another object of this invention to provide a new and improved process for producing polyethylene terephthalate through the use of novel catalysts that accelerate the polyester forming reactions.

It is a further object of this invention to provide a catalyzed process for preparing polymeric polyesters which have excellent color characteristics.

Other objects and advantages of this invention will be apparent from the description thereof which follows.

The objects of this invention are accomplished by conducting the polymerization of the reactive intermediates obtained from glycols and dicarboxylic acids or polyester-forming derivatives thereof into high molecular weight polyesters in the presence of catalytic amounts of certain metal hexafluorosilicates.

The hexafluorosilicates of this invention are compounds of the formula $$MSiF_6$$

wherein M is a metal selected from groups 2B, 7B and 8 of the Periodic Chart of Elements. Illustrative of metal hexafluorosilicates coming within the scope of the above structural formula are those of the following metals: the group 2B metals including zinc, cadmium, and mercury; the group 7B metals including manganese, technetium and rhenium; and the group 8 metals including iron, cobalt, nickel, ruthenium, rhodium, palladium, osmium, iridium, and platinum. The Periodic Chart of Elements referred to above and throughout the specification and claims may be found on page 57 of Lange's Handbook of Chemistry, 8th Ed. (1952).

The hexafluorosilicates of this invention may be prepared by reacting the carbonate, oxide, acetate, or the like of the desired metal with hexafluorosilicic acid. The hexafluorosilicic acid may be prepared by the reaction of silicon tetrafluoride and hydrogen fluoride or by the reaction of silicon tetrafluoride and water. The hexafluorosilicates used in this invention normally exist as hydrates and usually have six molecules of water attached to each hexafluorosilicate molecule. However, this water will be driven off under the polymerization conditions used to carry the present invention. Therefore, for the purposes of the present invention, the hydrated as well as the unhydrated hexafluorosilicates may be used.

The amount of hexafluorosilicate employed should be from about 0.01 to 0.5 percent by weight, based on the weight of dicarboxylic acid or esterforming derivative thereof used. It is preferred that the amount of hexafluorosilicate used be from about 0.03 to 0.1 percent by weight, based on the weight of dicarboxylic acid or ester-forming derivative thereof used. The particular hexafluorosilicate to be used as a catalyst may be added to the reaction at any point prior to the polymerization step.

The synthetic linear condensation polyesters contemplated in the practice of the invention are those formed from dicarboxylic acids and glycols, and copolyesters or modifications of these polyesters and copolyesters. In a highly polymerized condition, these polyesters and copolyesters can be formed into filaments and the like and subsequently oriented permanently by cold drawing. The polyesters and copolyesters specifically useful in the instant invention are those resulting from heating one or more of the glycols of the series $HO(CH_2)_nOH$, in which $n$ is an integer from 2 to 10, with one or more dicarboxylic acids or ester-forming derivatives thereof. Among the dicarboxylic acids and ester-forming derivatives thereof useful in the present invention there may be named terephthalic acid, isophthalic acid, sebacic acid, adipic acid, p-carboxyphenylacetic acid, succinic acid, p,p'-dicarboxybiphenyl, p,p'-dicarboxycarbanilide, p,p'-dicarboxythiocarbanilide, p,p'-dicarboxydiphenylsulfone, p-carboxyphenoxyacetic acid, p-carboxyphenoxypropionic acid, p-carboxyphenoxybutyric acid, p-carboxy-phenoxy-valeric acid, p-carboxyphenoxyhexanoic acid, p-carboxyphenoxy heptanoic acid, p,p'-dicarboxydiphenylmethane, p,p'-dicarboxydiphenylethane, p,p'-dicarboxydiphenylpropane, p,p'-dicarboxydiphenylbutane, p,p'-dicarboxydiphenylpentane, p,p'-dicarboxydiphenylhexane, p,p'-dicarboxydiphenylheptane, p,p'-dicarboxydiphenyloctane, p,p'-dicarboxydiphenoxyethane, p,p' - dicarboxydiphenoxypropane, p,p'-dicarboxydiphenoxybutane, p,p'-dicarboxydiphenoxypentane, p,p'-dicarboxydiphenoxyhexane, 3-alkyl-4-(beta-carboxy ethoxy) banzoic acid, oxalic acid, glutaric acid, pimelic acid, suberic acid, azelaic acid and the dioxy acids of ethylene dioxide having the general formula $$HOOC—(CH_2)_n—O—CH_2CH_2—O—(CH_2)_n—COOH$$

wherein $n$ is an integer from 1 to 4, and the aliphtic and cycloaliphatic aryl esters and half esters, ammonium and amine salts, and the acid halides of the above-named compounds and the like. Examples of the glycols which may be employed in practicing the instant invention are ethylene glycols, trimethylene glycol, tetramethylene glycol and decamethylene glycol, and the like. Polyethylene terephthalate, however, is preferred because of the ready availability of terephthalic acid and ethylene glycol, from which it is made. It also has a relatively high melting point of about 250 through 265° C. and this property is particularly desirable in the manufacture of filaments in the textile industry.

Among the modified polyesters and copolyesters which are useful in the practice of the instant invention are the polyesters and copolyesters mentioned above modified with chain terminating groups having hydrophilic properties, such as the monofunctional ester-forming polyesters bearing the general formula (1)        $R-O-[(CH_2)_mO]_x(CH_2)_n-OH$ wherein R is an alkyl group containing 1 to 18 carbon atoms or an aryl group containing 6 to 10 carbon atoms, and $m$ and $n$ are integers from 2 to 22 and $x$ is a whole number indicative of the degree of polymerization, that is, $x$ is an integer from 1 to 100 or greater. Examples of such compounds are methoxypolyethylene glycol, ethoxypolyethylene glycol, n-propoxypolyethylene glycol, isopropoxypolyethylene glycol, butoxypolyethylene glycol, phenoxypolyethylene glycol, methoxypolypropylene glycol, methoxypolybutylene glycol, phenoxypolypropylene glycol, phenoxypolybutylene glycol, methoxypolymethylene glycol, and the like. Suitable polyalkylvinyl ethers having one terminal hydroxyl group are the addition polymers prepared by the homopolymerization of alkylvinyl ethers wherein the alkyl group contains from 1 to 4 carbon atoms. Examples of such chain-terminating agents are polymethylvinyl ether, polyethylvinyl ether, polypropylvinyl ether, polybutylvinyl ether, polyisobutylvinyl ether, and the like. The chain-terminating agents or compounds may be employed in the preparation of the modified polyesters in amounts ranging from 0.05 mole percent to 4.0 mole percent, based on the amount of dicarboxylic acid or dialkyl ester thereof employed in the reaction mixture. It is to be noted that when chain-terminating agents are employed alone, i.e., without a chain-branching agent, the maximum amount that can be employed in the reaction mixture is 1.0 mole percent. Thus, unexpectedly, the addition of controlled amounts of chain-branching agents along with the chain-terminating agents allows the introduction of an increased amount of the latter into the polymer chain than is otherwise possible when employing the chain-terminating agents alone.

One will readily appreciate that the weight percent of chain-terminating agent which may be employed in this invention will vary with the molecular weight of the agent. The range of average molecular weights of the chain-terminating agents suitable for use in this invention is from 500 to 5000, with those agents having a molecular weight in the range of 1000 to 3500 being preferred.

Materials suitable as chain-branching agents or cross-linking agents, which are employed to increase the viscosity or molecular weight of the polyesters, are the polyols which have a functionality greater than two, that is, they contain more than two functional groups, such as hydroxyl. Examples of suitable compounds are pentaerythritol; compounds having the formula:

$$R-(OH)_n$$

wherein R is an alkylene group containing from 3 to 6 carbon atoms and $n$ is an integer from 3 to 6, for example, glycerol, sorbitol, hexane triol-1,2,6, and the like; compounds having the formula:

$$R-(CH_2OH)_3$$

wherein R is an alkyl group containing from 2 to 6 carbon atoms, for example, trimethylol ethane, trimethylol propane, and the like compounds up to trimethylol hexane; and the compounds having the formula:

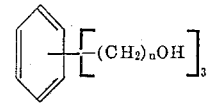

wherein $n$ is an integer from 1 to 6. As examples of compounds having the above formula there may be named trimethylol benzene-1,3,5, triethylol benzene-1,3,5, tripropylol benzene-1,3,5 tributylol benzene-1,3,5, and the like.

Aromatic polyfunctional acid esters may also be employed in this invention as chain-branching agents and particularly those having the formula

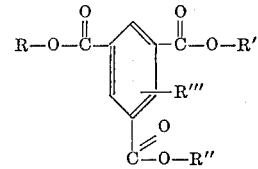

and in which R, R' and R'' are alkyl groups containing 1 to 3 carbon atoms and R''' is hydrogen or alkyl groups having 1 to 2 carbon atoms. As examples of compounds having the above formula there may be named trimethyl trimesate, tetramethyl pyromellitate, tetramethyl mellophonate, trimethyl hemimellitate, trimethyl trimellitate, tetramethyl prehnitate, and the like. In addition, there may be employed mixtures of the above esters which are obtained in practical synthesis. That is, in most instances, when preparing any of the compounds having the above formula, other related compounds having the same formula may be present in small amounts as impurities. This does not affect the compound as a chain-branching agent in the preparation of the modified polyesters and copolyesters described herein.

The chain-branching agents or cross-linking agents may be employed in the preparation of the polyesters and copolyesters in amounts ranging from 0.05 mole percent to 2.4 mole percent, based on the amount of dicarboxylic acid or dialkyl ester thereof employed in the reaction mixture. The preferred range of chain-branching agent for use in the present invention is from 0.1 to 1.0 mole percent.

In the practice of the present invention, the dibasic acid or ester thereof and the glycol are charged to the reaction vessel at the beginning of the first stage of the esterification reaction and the reaction proceeds as in any well-known esterification polymerization. If desired, the calculated amounts of chain-terminating agent or chain-terminating agent and chain-branching agent or cross-linking agent are also charged to the reaction vessel at this time.

When preparing the polyester from an ester, such as dimethyl terephthalate, the first stage of reaction is carried out at about 170–180° C. and at a pressure of 0 to 7 p.s.i.g. If the polyester is prepared from the acid, such as terephthalic acid, the first stage of reaction is carried out at about 220–260° C. and at a pressure of 15 to 60 p.s.i.g. The methanol or water evolved during the first stage of reaction is continuously removed by distillation. At the completion of the first stage, the excess glycol, if any, is distilled off prior to entering the second stage of the reaction.

In the second or polymerization stage, the reaction is conducted at reduced pressures and preferably in the presence of an inert gas, such as nitrogen, in order to prevent oxidation. This can be accomplished by maintaining a nitrogen blanket over the reactants, said nitrogen containing less than 0.003 percent oxygen. For optimum results, a pressure within the range of less than 1 mm. up to 5 mm. of mercury is employed. This reduced pressure is necessary to remove the free ethylene glycol that is formed during this stage of the reaction, the ethylene glycol being volatilized under these conditions and removed from the system. The polymerization step is conducted at a temperature in the range of 220° to 300° C. This stage of the reaction may be effected either in the liquid, melt or solid phase. In the liquid phase, particularly, reduced pressures must be employed in order to remove the free ethylene glycol which emerges from the polymer as a result of the condensation reaction.

Although the process of this invention may be conducted stepwise, it is particularly adaptable for use in the continuous production of polyesters. In the preparation of the described polyesters, the first stage of the reaction takes place in approximately ¾ to 2 hours. The use of an ester-interchange catalyst is desirable when starting with dimethyl terephthalate. In the absence of a catalyst, times up to 6 hours may be necessary in order to complete this phase of the reaction. In the polymerization stage, a reaction time of approximately 1 to 4 hours may be employed with a time of 1 to 3 hours being the optimum, depending on catalyst concentration, temperature, viscosity desired, and the like.

The linear condensation polyesters, produced in accordance with the present invention, have specific viscosities in the order of about 0.25 to 0.6, which represent the fiber-and filament-forming polymers. It is to be understood, of course, that non-fiber-forming polyesters may be produced by means of the present invention, which have a greater or less melt viscosity than that reiterated above. For example, polyesters which are useful in coating compositions, lacquers, and the like are within the scope of the present invention.

Specific viscosity, as employed herein, is represented by the formula:

$$N_{sp} = \frac{\text{Time of flow of the polymer solution in seconds}-1}{\text{Time of flow of the solvent in seconds}}$$

Viscosity determinations of the polymer solutions and solvent are made by allowing said solutions and solvent to flow by force of gravity at 25° C. through a capillary viscosity tube. In all determinations of the polymer solution viscosities, a polymer containing 0.5 percent by weight of the polymer dissolved in a solvent mixture containing two parts by weight of phenol and one part by weight of 2,4,6-trichlorophenol, and 0.5 percent by weight of water, based on the total weight of the mixture, is employed.

The polyesters of this invention may be produced to form filaments and films by melt spinning methods and can be extruded or drawn in the molten state to yield products that can be subsequently cold drawn to the extent of several hundred percent of their original lengths, whereby molecularly oriented structures of high tenacity may be obtained. The condensation product can be cooled and comminuted followed by subsequent remelting and processing to form filaments, films, molded articles, and the like.

Alternatively the polyesters of this invention may be processed to shaped objects by the wet spinning method, wherein the polyesters are dissolved in a suitable solvent and the resulting solution extruded through a spinneret into a bath composed of a liquid that will extract the solvent from the solution. As a result of this extraction, the polyester is coagulated into filamentary material. The coagulated material is withdrawn from the bath and is then generally subjected to a stretching operation in order to increase the tenacity and to induce molecular orientation therein. Other treating and processing steps may be given the oriented filaments.

If it is desired to produce shaped articles from the polyesters of the present invention which have a modified appearance or modified properties, various agents may be added to the polyester prior to the fabrication of the articles or these agents may be incorporated with the initial reactants. Such added agents might be plasticizers, antistatic agents, fire-retarding agents, stabilizers, and the like.

To further illustrate the present invention and the advantages thereof, the following specific examples are given, it being understood that these are merely intended to be illustrative and not limitative. Unless otherwise indicated, all parts and percents are by weight.

The yarn color test employed in the examples consisted of determinations on the proximity to complete whiteness by reflectance measurements made by using a spectrophotometer. The methods used were those recommended by the Standard Observer and Coordinate System of the International Commission on Illumination as fully set forth in the Handbook of Colorimetry, published in 1936 by the Technology Press, Massachusetts Institute of Technology. The results are to be interpreted as approaching complete whiteness to the degree that the values given approach 100, which is taken as the complete whiteness value.

The specific viscosity values given in the examples were determined at zero spinning times and were measured at about 25° C. in a mixture of 133.5 grams of phenol, 66.8 grams of trichlorophenol, and 1 gram of water.

Example 1

A charge containing 200 grams of terephthalic acid, 400 ml. of ethylene glycol, 0.5 gram of calcium terephthalate, and 0.075 gram of zinc hexafluotitanate was added directly to a polyester autoclave and the system was purged 6 times with nitrogen, allowing the pressure to rise to 150 p.s.i.g., and then releasing it slowly to atmospheric pressure each time. The maximum rate of heating was then applied to the closed system, and when the temperature inside the bomb had reached 100 to 125° C., the stirrer was slowly started. When the temperature of the outside wall of the autoclave had reached about 250° C. (the inside temperature being about 230–235° C. and the pressure being about 25 p.s.i.g.), the off-vapor valve was adjusted to maintain these conditions of temperature and pressure. As the first distillate containing water and some ethylene glycol appeared, the esterification stage was considered to have started. The stirrer speed was set at 150 r.p.m. The esterification step took about 40 minutes for completion, after which the pressure of the system was adjusted to atmospheric pressure. The heating rate was then increased until the temperature reached about 280° C. During this time, excess ethylene glycol was distilled off. An ethylene glycol slurry of titanium dioxide was introduced through an injection port when the inside temperature had reached about 260° C. to 265° C. When the inside temperature reached about 280° C., vacuum was applied. The inside temperature was maintained at about 280° C. and the pressure was maintained at about 0.1 mm. Hg, and the polymerization continued until a polymer having a specific viscosity of 0.285 was obtained. The polymerization time for preparing the polymer was 23 minutes.

Fiber was spun from the polymer prepared above using conventional melt spinning procedures. However, the fiber was a dirty yellow color and had a whiteness value of less than 45.

This example shows the use of a known polyester polymerization catalyst to produce a high molecular weight polymer in a short polymerization time. However, the resulting fiber had very poor whiteness.

Example 2

A polyester autoclave was charged with 200 grams of terephthalic acid, 400 ml. of ethylene glycol, 0.1 gram of sodium sulfate, and 0.165 gram of manganous acetylacetonate. Polyethylene terephthalate having a specific viscosity of 0.305 was prepared from this mixture following the procedure of Example 1. The polymerization time for preparing the polymer was 105 minutes.

Fiber was spun from the polymer prepared above using conventional melt spinning procedures. The fiber was found to have a whiteness value of 82.

This example shows the use of a known polyester polymerization catalyst to produce a high molecular weight polymer having good whiteness. However, the polymerization time necessary to produce the polymer was extremely long.

Example 3

A polyester autoclave was charged with 200 grams of terephthalic acid, 400 ml. of ethylene glycol, 0.1 gram of sodium sulfate, and 0.1365 gram of zinc hexafluorosilicate. Polyethylene terephthalate having a specific viscosity of 0.321 was prepared from this mixture following the procedure of Example 1. The polymerization time for preparing the polymer was 38 minutes.

Fiber was spun from the polymer prepared above using conventional melt spinning procedures. This fiber was found to have a whiteness value of 85.

Example 4

Polyethylene teraphthalate was produced using the autoclave charge and the procedure of Example 3 except that 0.0683 gram of zinc hexafluorosilicate was used instead of 0.1365 gram. The polymerization time for preparing the polyethylene terephthalate was 72 minutes and the polymer obtained had a specific viscosity of 0.298.

Fiber was spun from the polymer prepared above using conventional melt spinning procedures. This fiber was found to have a whiteness value of 85.

Example 5

A polyester autoclave was charged with 200 grams of terephthalic acid, 00 ml. of ethylene glycol, 0.1 gram of sodium sulfate, and 0.132 gram of cobalt hexafluorosilicate. Polyethylene terephthalate having a specific viscosity of 0.32 was prepared from this mixture following the procedure of Example 1. The polymerization time for preparing the polymer was 55 minutes.

Fiber was spun from the polymer prepared above using conventional melt spinning procedures. This fiber was found to have a whiteness value of 95.

Example 6

Polyethylene terephthalate may be produced following the procedure of Example 5 using manganese hexafluorosilicate as a catalyst in place of the cobalt hexafluorosilicate. Excellent fibers and filaments may be prepared from the polymer using conventional melt spinning procedures.

It is to be understood that changes and variations may be made in the present invention without departing from the spirit and scope thereof as defined in the appended claims.

What is claimed is:

1. In a process for producing synthetic, highly polymeric polyesters wherein a compound selected from the group consisting of dicarboxylic acids and ester-forming derivatives thereof and a molar excess of a polymethylene glycol having the formula, $HO(CH_2)_nOH$, wherein $n$ is an integer from 2 to 10 are reacted under polyesterification conditions and the reaction is continued until a highly polymeric product is formed, the improvement which comprises carrying out the polymerization step in the presence of a catalytic amount of a hexafluorosilicate selected from a group consisting of compounds of the formula $$MSiF_6$$

wherein M is a metal selected from group 8 of the Periodic Chart of Elements.

2. In a process for producing synthetic, highly polymeric polyesters wherein a compound selected from the group consisting of dicarboxylic acids and ester-forming derivatives thereof and a molar excess of a polymethylene glycol having the formula, $HO(CH_2)_nOH$, wherein $n$ is an integer from 2 to 10 are reacted under polyesterification conditions and the reaction is continued until a highly polymeric product is formed, the improvement which comprises carrying out the polymerization step in the presence of from about 0.01 to 0.5 percent by weight, based on the weight of the selected compound, of a hexafluorosilicate selected from the group consisting of compounds of the formula $$MSiF_6$$

wherein M is a metal selected from group 8 of the Periodic Chart of Elements.

3. In a process for producing synthetic, highly polymeric polyesters wherein a compound selected from the group consisting of dicarboxylic acids and ester-forming derivatives thereof and a molar excess of a polymethylene glycol having the formula, $HO(CH_2)_nOH$, wherein $n$ is in integer from 2 to 10 are reacted under polyesterification conditions and the reaction is continued until a highly polymeric product is formed, the improvement which comprises carrying out the polymerization step in the presence of from about 0.03 to 0.1 percent by weight, based on the weight of the selected compound, of a hexafluorosilicate selected from the group consisting of compounds of the formula $$MSiF_6$$

wherein M is a metal selected from group 8 of the Periodic Chart of Elements.

4. In a process for producing highly polymeric polyethylene terephthalate wherein a compound selected from the group consisting of terephthalic acid and ester-forming derivatives thereof and a molar excess of ethylene glycol are reacted under polyesterification conditions and the reaction is continued until a highly polymeric product is formed, the improvement which comprises carrying out the polymerization step in the presence of from about 0.03 to 0.1 percent by weight, based on the weight of the selected compound, of a hexafluorosilicate selected from the group consisting of compounds of the formula $$MSiF_6$$

wherein M is a metal selected from group 8 of the Periodic Chart of Elements.

5. The process as defined in claim 4 wherein the hexafluorosilicate used is cobalt hexafluorosilicate.

6. In a process for the production of a synthetic, highly polymeric polyester which comprises the steps of forming a reaction mixture of a compound selected from the group consisting of dicarboxylic acids and ester-forming derivatives thereof and a molar excess of a polymethylene glycol having the formula, $HO(CH_2)_nOH$, wherein $n$ is an integer from 2 to 10, heating said reaction mixture to a elevated temperature sufficient to induce the reaction between the selected compound and the glycol, maintaining the reaction mixture at the elevated temperature until the reaction is substantially completed, continuously removing the by-products by distillation as they are formed during the reaction, then raising the temperature of the reaction mixture in a range of above the boiling point of the glycol to remove excess glycol in the reaction mixture, and maintaining the reaction mixture at an elevated temperature and under a reduced pressure until a highly polymeric product is formed, the improvement which comprises carrying out the polymerization step in the presence of a hexafluorosilicate selected from the group consisting of compounds of the formula $$MSiF_6$$

wherein M is a metal selected from group 8 of the Periodic Chart of Elements.

7. In a process for production of a synthetic, highly polymeric polyester which comprises the steps of forming a reaction mixture of a compound selected from the group consisting of dicarboxylic acids and ester-forming derivatives thereof and from about 2 to 20 moles per mole of the selected compound of a polymethylene glycol having the formula, $HO(CH_2)_nOH$, wherein $n$ is an integer from 2 to 10, heating said reaction mixture to a elevated temperature sufficient to induce the reaction between the selected compound and the glycol, maintaining the reaction mixture at the elevated temperature until the reaction is substantially completed, continuously removing the by-products by distillation as they are formed during the reaction, then raising the temperature of the reaction mixture in a range above the boiling point of said glycol to remove excess glycol in the reaction mixture, and maintaining the reaction mixture at an elevated temperature and under a reduced pressure until a highly polymeric product is formed, the improvement which comprises carrying out the polymerization step in the presence of from about 0.01 to 0.5 percent by weight, based on the weight of the selected compound, of a hexafluorosilicate selected from the group consisting of compounds of the formula $$MSiF_6$$

wherein M is a metal selected from group 8 of the Periodic Chart of Elements.

8. In a process for production of a synthetic, highly polymeric polyester which comprises the steps of forming a reaction mixture of a compound selected from the group consisting of dicarboxylic acids and ester-forming derivatives thereof and from about 2 to 20 moles per mole of the selected compound of a polymethylene glycol having the formula $HO(CH_2)_nOH$, wherein $n$ is an integer from 2 to 10, heating said reaction mixture to an elevated temperature sufficient to induce the reaction between the selected compound and the glycol, maintaining the reaction mixture at the elevated temperature until the reaction is substantially completed, continuously removing the by-products by distillation as they are formed during the reaction, then raising the temperature of the reaction mixture in a range above the boiling point of said glycol to remove excess glycol in the reaction mixture, and maintaining the reaction mixture at an elevated temperature and under a reduced pressure until a highly polymeric product is formed, the improvement which comprises carrying out the polymerization step in the presence of from about 0.03 to 0.1 percent by weight, based on the weight of the selected compound, of a hexafluorosilicate selected from the group consisting of compounds of the formula $$MSiF_6$$

wherein M is a metal selected from group 8 of the Periodic Chart of Elements.

9. In a process for production of a synthetic, highly polymeric polyester which comprises the steps of forming a reaction mixture of a member selected from the group consisting of dicarboxylic acids and ester-forming derivatives thereof and from about 2 to 20 moles per mole of the selected compound of a polymethylene glycol having the formula $HO(CH_2)_nOH$, wherein $n$ is an integer from 2 to 10, heating said reaction mixture to an elevated temperature sufficient to induce the reaction between the selected compound and the glycol, maintaining the reaction mixture at the elevated temperature until the reaction is substantially completed, continuously removing the by-products by distillation as they are formed during the reaction, then raising the temperature of the reaction mixture in a range above the boiling point of said glycol to remove excess glycol in the reaction mixture, and maintaining the reaction mixture at an elevated temperature and under a reduced pressure until a synthetic polyester having fiber-forming properties is formed, the improvement which comprises carrying out the polymerization step in the presence of from about 0.03 to 0.1 percent by weight, based on the weight of the selected compound, of a hexafluorosilicate selected from the group consisting of compounds of the formula $$MSiF_6$$

wherein M is a metal selected from group 8 of the Periodic Chart of Elements.

10. In a process for the production of a highly polymeric polyethylene terephthalate which comprises the steps of forming a reaction mixture of a compound selected from the group consisting of terephthalic acid and ester-forming derivatives thereof and from about 2 to 20 moles per mole of the selected compound of ethylene glycol, heating said reaction mixture to an elevated temperature sufficient to induce the reaction between the selected compound and the glycol, maintaining the reaction mixture at the elevated temperature until the reaction is substantially completed, continuously removing the by-products by distillation as they are formed during the reaction, then raising the temperature of the reaction mixture in a range above the boiling point of the glycol to remove excess glycol in the reaction mixture, and maintaining the reaction mixture at an elevated temperature and under a reduced pressure until polyethylene terephthalate having fiber-forming properties is formed, the improvement which comprises carrying out the polymerization step in the presence of from about 0.03 to 0.1 percent by weight, based on the weight of the selected compound, of a hexafluorosilicate selected from the group consisting of compounds of the formula $$MSiF_6$$

wherein M is a metal selected from group 8 of the Periodic Chart of Elements.

11. The process as defined in claim 10 wherein the hexafluorosilicatt used is cobalt hexafluorosilicate.

References Cited
UNITED STATES PATENTS
3,228,913    1/1966    Nesty et al.

WILLIAM H. SHORT, *Primary Examiner.*

L. P. QUAST, *Assistant Examiner.*